(12) United States Patent
Ginter et al.

(10) Patent No.: US 6,676,025 B2
(45) Date of Patent: Jan. 13, 2004

(54) TEMPERATURE-CONTROLLED MIXER VALVE

(75) Inventors: Gerhard Ginter, Tennenbronn (DE); Andreas Ginter, Schramberg-Heiligenbronn (DE); Franz Wanner, Neuried (DE)

(73) Assignee: Hansgrohe AG, Schiltach (DE)

( * ) Notice: Subject to any disclaimer, the term of this patent is extended or adjusted under 35 U.S.C. 154(b) by 0 days.

(21) Appl. No.: 10/203,570

(22) PCT Filed: Feb. 10, 2001

(86) PCT No.: PCT/EP01/01488

§ 371 (c)(1),
(2), (4) Date: Dec. 23, 2002

(87) PCT Pub. No.: WO01/59341

PCT Pub. Date: Aug. 16, 2001

(65) Prior Publication Data

US 2003/0173410 A1 Sep. 18, 2003

(30) Foreign Application Priority Data

Feb. 12, 2000 (DE) .......................... 100 06 375

(51) Int. Cl.$^7$ ................................ G05D 23/13
(52) U.S. Cl. ..................... 236/12.2; 137/625.4
(58) Field of Search ............ 236/12.21, 12.22; 137/625.17, 625.4

(56) References Cited

U.S. PATENT DOCUMENTS

| | | | | |
|---|---|---|---|---|
| 3,693,660 A | * | 9/1972 | Wheelock | 137/625.4 |
| 4,540,023 A | | 9/1985 | Pawelzik | 137/625 |
| 4,617,965 A | * | 10/1986 | Lorch | 137/625.17 |
| 4,768,557 A | * | 9/1988 | Holzer | 137/636.2 |
| 4,941,509 A | | 7/1990 | Orlandi | 137/625 |
| 4,971,113 A | | 11/1990 | Pawelzik et al. | 137/625 |
| 5,340,018 A | | 8/1994 | MacDonald | 236/12.2 |
| 5,609,188 A | * | 3/1997 | Oberdorfer | 137/625.4 |
| 5,657,791 A | | 8/1997 | Graber | 137/625 |
| 5,887,852 A | * | 3/1999 | Delaisement | 251/285 |
| 5,983,938 A | * | 11/1999 | Bowers et al. | 137/625.17 |

FOREIGN PATENT DOCUMENTS

| | | | | |
|---|---|---|---|---|
| DE | 3525052 A1 | 1/1987 | | F16K/11/00 |
| DE | 3546504 A1 | 3/1987 | | F16K/11/00 |
| DE | 3612988 A1 | 10/1987 | | F16K/11/00 |
| DE | 4120024 A1 | 12/1992 | | F16K/11/00 |
| DE | 4300183 A1 | 7/1994 | | F16K/11/00 |
| DE | 19716307 A1 | 10/1998 | | F16K/11/065 |
| EP | 0 356 402 A1 | 7/1989 | | F16K/11/00 |
| WO | WO 92/22862 | 12/1992 | | G05D/23/13 |

* cited by examiner

*Primary Examiner*—William E. Tapolcai
(74) *Attorney, Agent, or Firm*—Duane Morris LLP

(57) ABSTRACT

A temperature-controlled mixer valve contains a disk control for determining the quantity of mixed water flowing out of the valve. To the disk control is connected a regulating unit, which determines the mixed water temperature. The control disk is movable with respect to the fixed distributor disk in a first degree of freedom for determining the mixed water quantity. By control disk movement in a second degree of freedom, the desired temperature of the thermostatic valve is modified.

21 Claims, 5 Drawing Sheets

ERSATZBLATT (REGEL 26)

TEMPERATURE-CONTROLLED MIXER VALVE

BACKGROUND

The invention is directed at a thermostatic fitting for sanitary purposes. Sanitary thermostatic fittings are e.g. used on a shower to supply mixed water with a mixed temperature between the hot and cold water temperature. Normally thermostatic fittings have an operating device making it possible to adjust the quantity of the outflowing water. A second operating element is used to determine the desired temperature of the mixed water by acting on the thermostatic valve.

Single lever mixer valves are known, in which by means of an operating device operating in a first direction it is possible to adjust the water quantity and in a second direction the water temperature.

A sanitary mixing set with a thermostatic control is known (WO 92/22862), in which the mixed water quantity is determined by a valve with disk control. The disk control contains a fixed distributor disk and a control disk movable with respect thereto in one direction. For modifying the mixed water temperature an operating device is provided on the thermostatic valve.

A thermostatically controlled mixer valve is also known (DE 19716307), in which a disk control is provided for regulating the quantity. The movable control disk is movable in one direction relative to the fixed distributor disk. The operating device is used for changing the mixed water desired temperature and also adjusts the mixed water quantity.

SUMMARY OF THE INVENTION

An object of the invention is to provide a temperature-controlled mixer, which does not differ from existing single lever mixers with respect to its operation and installation dimensions.

The present invention proposes a temperature-controlled mixer valve that meets this and other objects.

The two ceramic disks together form a disk control. Both the fixed and the movable ceramic disk contain openings issuing into the control surface. The control surface is the surface of the two control disks which forms the bearing or contact surface. Through a more or less pronounced coincidence of these openings, a change to the cross-section is brought about. In the case of the valve proposed by the invention said disk control is exclusively used for controlling the mixed water quantity, whereas setting and regulating of the mixed water temperature is the responsibility of the regulating unit.

According to a further development of the invention the axis of the thermostat and therefore also its action direction is parallel to the control surface of the control disks. This permits a space-saving arrangement of the mixer valve, so that it can be housed in a small casing.

According to a further development of invention, the regulating unit is arranged in such a way that it is moved together with the control disk and this helps to bring about a small size of the arrangement.

According to a further development of the invention, the movable control disk is constructed so as to be movable in a second degree of freedom, said movement in a second degree of freedom preferably being brought about by the same lever as is used for controlling the mixed water quantity. This movement in a second degree of freedom can be utilized for other purposes.

It can in particular be provided that the movement of the control disk in the second degree of freedom does not lead to a change in the conditions of the flow cross-sections of the openings of the control disks between the flow path for the cold water and the flow path for the hot water.

According to a further development of the invention, the operating device is operable in a second movement direction, particularly for modifying the setting of the mixed water temperature. As a result the sanitary mixer valve can be operated in precisely the same way as a conventional single lever mixer valve, but with the difference that then the regulating unit for the mixed water temperature undergoes a modification to its desired value position.

It can additionally be provided that the adjustment of the desired temperature of the mixer valve can be set, so that e.g. in a random or middle position of the operating device it is possible to set the temperature to e.g. 38° C.

According to a further development of the invention, the regulation unit is positioned in such a way that the outlet for the mixed water and/or the extensible material element, considered in the flow direction, is between the hot water valve seat and the cold water valve seat. The two flows are then directed against one another downstream of the particular valve seat, so that there is a better mixing of the two flows and consequently the determination of the actual temperature of the mixed water by the regulating unit is ensured.

The regulating unit to be moved together with the movable control disk can, e.g. according to a further feature of the invention, be placed in the movable control disk. This can contain the entire geometry for the valve seats and the inflow and outflow. The control disk can e.g. be manufactured by ceramic extrusion.

It is also possible and is proposed by the invention that the regulating unit is located in the dog of the movable control disk. Said dog can e.g. be extruded from plastic.

According to a further development of the invention, to change the desired temperature an eccentric surface is provided, on which acts a component operatively connected to the regulating unit, e.g. an adjusting cap, which slides on the eccentric surface during the movement of the control disk.

The adjusting cap is preferably placed in the movable control disk and/or the dog in such a way that said parts can be moved together with one another.

According to a further development of the invention, the eccentric surface is formed on the inside of the wall of a cartridge casing, which can be in one piece.

It is also possible to construct the eccentric surface on the inside of a slider, which is located within a cartridge casing and extends in the circumferential direction.

It can in particular be provided that said slider is adjustable circumferentially with respect to the cartridge casing so as in this way to bring about a setting of the normal position of the mixer valve/thermostatic valve.

It is possible according to the invention to operatively connect the adjusting cap with the regulating unit in such a way that with a control disk movement in the quantity change direction there is no adjustment to the thermostat.

This can e.g. take place in that the regulating unit is supported with a tappet in a groove in the adjusting cap. The groove extends in the direction of the control disk quantity change.

BRIEF DESCRIPTION OF THE DRAWINGS

Further features, details and advantages of the invention can be gathered from the following description of a preferred embodiment of the invention, as well as the attached drawings, wherein show.

DETAILED DESCRIPTION

Figure 1:
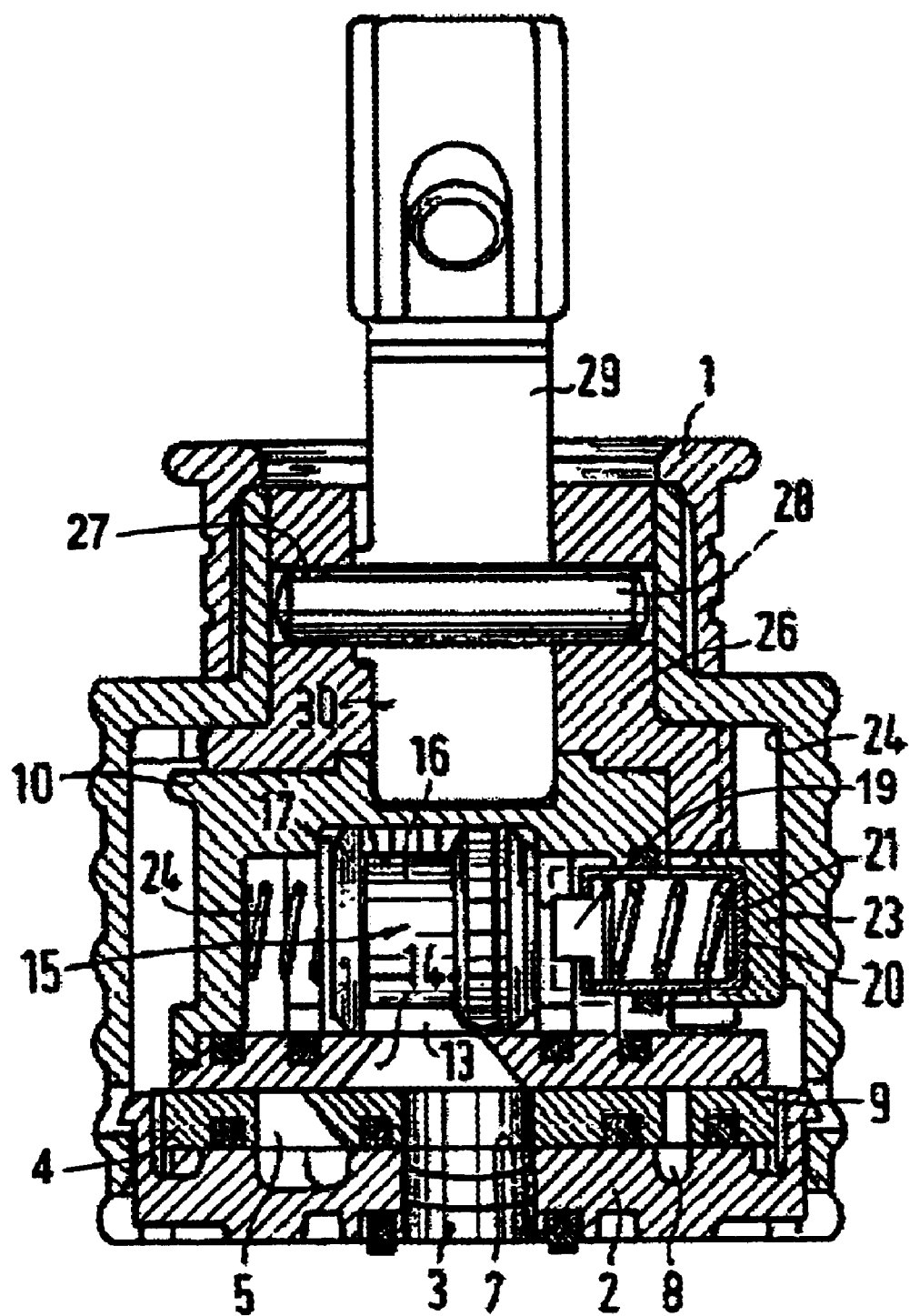
FIG. 1 An axial section through a valve cartridge according to the invention.

FIG. 1 is an axial section through a valve cartridge for insertion into a fitting casing. The valve cartridge 1 is terminated by a base 2, which is provided with openings coinciding with the openings in the base of a fitting casing. The valve cartridge is inserted in a reception space of such a fitting casing which contains or forms the connections between the mixed water supply and discharge pipes. The cartridge casing only contains the actual mixer valve. FIG. 1 only shows one opening 3 in the base 2 of the cartridge 1 and said opening is used for the mixed water leaving the mixer valve. Above the base 2 in the cartridge casing 1 is secured a fixed, ceramic distributor disk 4, which also has openings 5. Said openings 5 pass from the underside of the control disk 4 resting on the base 2 to the facing control surface 7. However, in said section they are not necessarily linear, but can instead be inclined, so that there need be no coincidence as regards the positioning of the issuing of openings 5 in the underside and control surface 7. The water passages passing through the individual openings are mutually sealed by seals located in grooves 8.

A movable control disk 9, which is held in a mounting support 10, rests on the fixed distributor disk 4. The movable control disk 9 has openings 11, 12 (see FIG. 5), which can be made to coincide with the openings 5 of the fixed control disk 4. For example, opening 11 is intended for hot water and opening 12 for cold water. Both openings 11, 12 lead into an annular space within the component comprising the movable control disk 9 and the mounting support 10. From said inner space 13, a circular opening 14 in the control disk 9 passes through an opening in the fixed distributor disk. Thus, the water can leave the valve from space 13 through the outlet opening 3 of the base 2.

Into the space formed within the movable control disk 9 is inserted a regulating unit 15 having a novel construction. The regulating unit 15 contains an extensible material element 16, which responds to temperature changes and reacts accordingly. The regulating unit has a piston-like valve element 17, which can be axially displaced through the action of the extensible material element. The piston-like valve element 17 is in each case associated with the marginal surface around the opening and forms there in each case a valve seat, whereof one valve seat is intended for the cold water and the other for the hot.

The regulating unit 15 contains the valve element 17 in which is located the extensible material element 16 and acts by means of a tappet 19 surrounded by a further tappet 20. A compression spring 21 is inserted between the two tappets 19, 20. The outer tappet 20 engages on the inner surface 22 of an adjusting cap 23, whose outside engages on the inside 24 of the cartridge casing. If the extensible material element 16 expands, it displaces the tappet 19 in such a way that by means of the unit formed by spring 21 and tappet 20 it moves the valve element 17 of regulating unit 15 to the left counter to the action of a further compression spring 24. During this movement there is a reduction in the flow cross-section of the valve formed by the opening and the valve element 17, whilst on the opposite side there is an increase in the spacing between the valve element 17 and the associated valve seat. Thus, the ratio of the flow cross-section of the hot water to the flow cross-section of the cold water is changed. Both flows flow through the openings formed by the valve element 17 into the space 13, where mixing takes place. The extensible material element 16 is exposed to the temperature of said mixed water. The desired temperature can be modified by the radial movement of the adjusting cap 23 and therefore by varying the position of the valve element 17. This radial displacement of the adjusting cap 23 will be explained hereinafter.

The dog 10 with the movable control disk 9 is guided by the bearing disk 26, which also contains an opening for guiding the adjusting cap 23. The bearing disk 26 has a bore 27 through which is passed the shaft 28 of a control lever 29. Thus, by rotating the control lever 29 the bearing disk 26 and with it the movable control disk 9 can be rotated.

Figure 2:
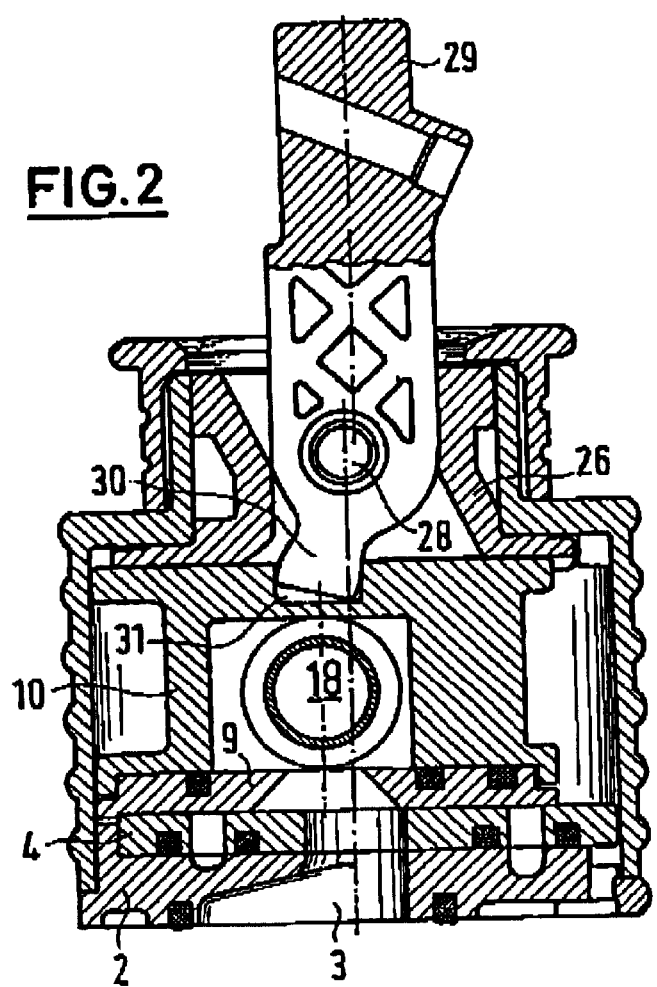
FIG. 2 An axial section along a plane displaced by 90°.

FIG. 2 shows a cross-section in a plane displaced by 90°. The lower end 30 of the control lever 29 engages in a depression 31 of the dog 10. A rotation of the control lever 29 around shaft 28 consequently leads to a displacement of the dog 10 and therefore the movable control disk 9 along the control surface 7.

FIG. 3 again shows the construction and arrangement of the regulating unit 15. The possible water flows are provided through the variably aligned openings, certain of which are indicated by dashed lines in FIGS. 3, 4 and 6a–6f. The flows are directed counter to one another, so that there is a good, thorough mixing in space 13.

Figure 3:
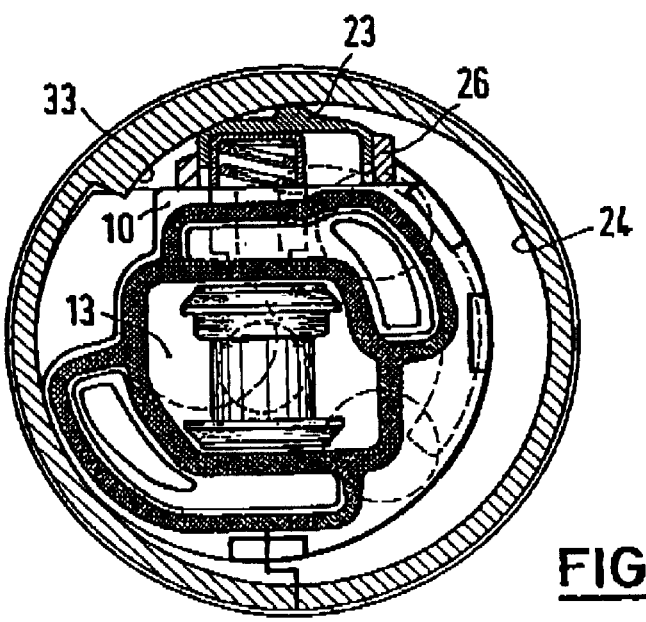
FIG. 3 A cross-section through the arrangement according to FIGS. 1 and 2.

The displacement of the movable control disk 9 by pivoting the lever 29 about shaft 28 leads to a movement from right to left or left to right in FIG. 3. During this displacement the adjusting cap 23 remains secured in the bearing sleeve 26 and consequently does not move with the same. Instead of this the outer tappet 20 slides on the corresponding surface of the adjusting cap 23.

The adjusting cap 23 engages on the inside 24 of the cartridge casing 1, said inside having an eccentric surface 33, which extends over a quarter to a third of the circumference. On rotating the movable control disk 9 there is a change to the position of the valve element 17, whereas on displacing the movable control disk 9 the adjusting cap 23 is not jointly moved. Thus, a change to the quantity of water flowing out of the mixer valve does not lead to a change in its temperature.

Figure 4:
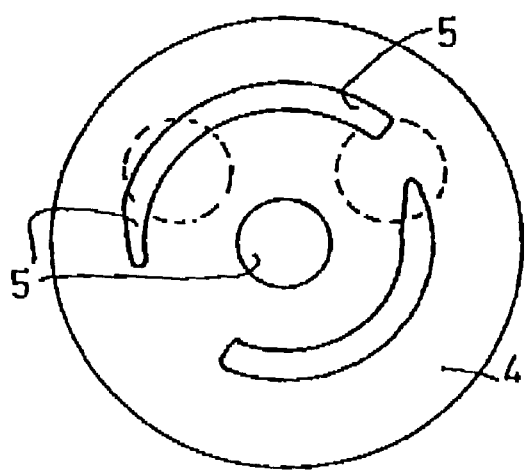
FIG. 4 A plan view of the fixed distribution disk from above in FIG. 1.

FIG. 4 is a plan view of the control surface 7 of the fixed distributor disk 4. Below the fixed distributor disk can be seen the supply openings in the base 2 of cartridge 1 and these are indicated by dashed line circles. Into the control surface 7 of disk 4 issue the through openings 5 for the hot and cold water in the form of narrow slots running in the circumferential direction. The two openings have a differing spacing from the center of the disk 4. The outer and inner edges are concentric. In the center of the disk is provided a circular opening serving as the outlet opening of the mixed water.

Figure 5:
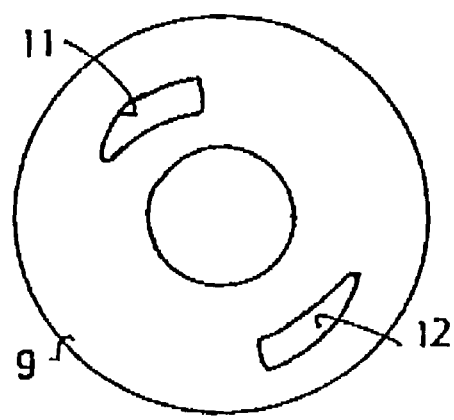
FIG. 5 A diagrammatic plan view from above of the movable control disk.

FIG. 5 is a diagrammatic plan view of the lower surface of the movable control disk 9 from above. This representation is chosen in this way to illustrate the issuing of the openings 11, 12 into the underside of disk 9 and namely with the same orientation as in FIG. 4. This representation is so chosen because by superimposing the two representations the actual mixing situation can be revealed. In the centre of the movable control disk 9 is provided a circular opening 34, whose diameter is much larger than the diameter of the central through opening 5 of the fixed distributor disk 4.

The two cold and hot water openings 11, 12 are also constructed as concentric, narrow, arcuate slots, whose radially measured width is the same as the width of the openings 5, but the arc length thereof is much shorter.

Figure 6A:
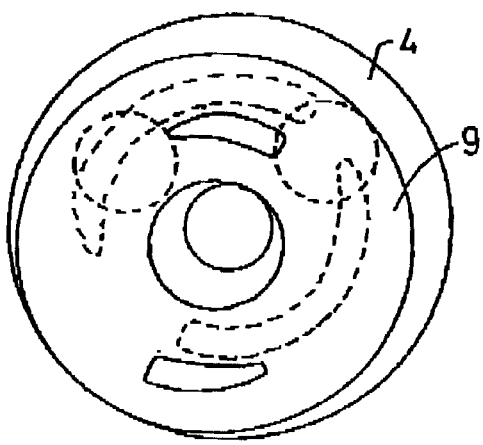
FIG. 6 Diagrammatically the association between both ceramic disks in several positions.

FIGS. 6a to 6f show possible different positions of the two control disks 4, 9 from above and namely in different displaced and rotated positions. FIG. 6a shows the position in which a high temperature is set, but the valve remains closed. This is apparent by the fact that the smaller, arcuate slots 11, 12 of the upper control disk 9 do not coincide with the openings 5 of the lower distributor disk 4.

Figure 6B:
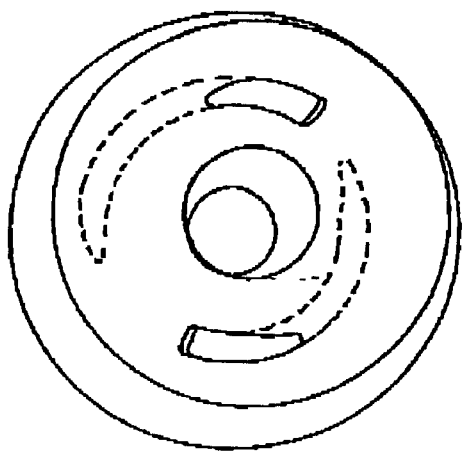

FIG. 6b shows with the temperature set hot and in an opened position. By displacing the movable control disk 9 from the position of FIG. 6a to the upper right and without rotation, said position is obtained.

Figure 6C:
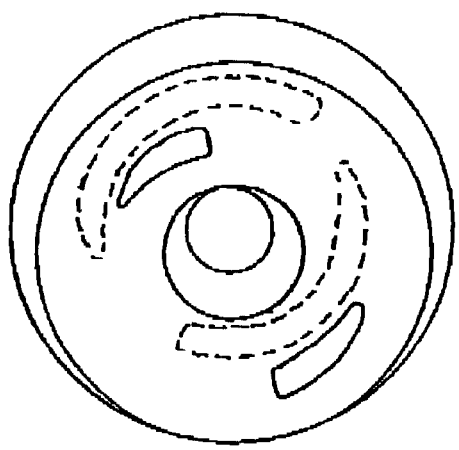
Figure 6D:
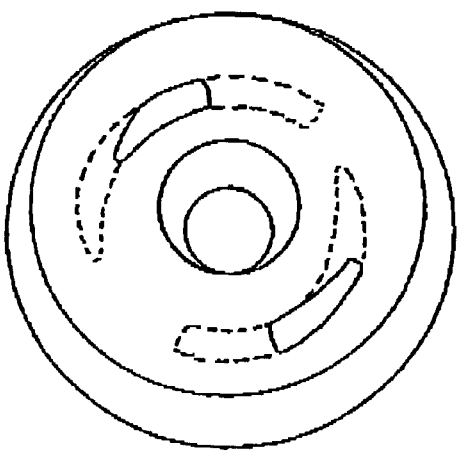

FIG. 6c shows a central position, i.e., a position with medium temperature in the closed state. If the movable control disk 9 is moved upwards, gradually the openings of the upper and lower control disk are made to coincide, which finally gives the position of FIG. 6d, where the valve is completely open.

Figure 6E:
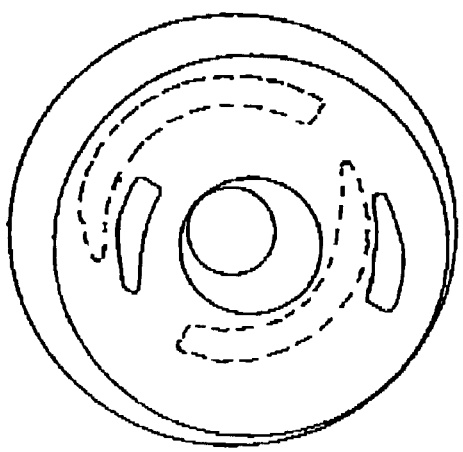
Figure 6F:
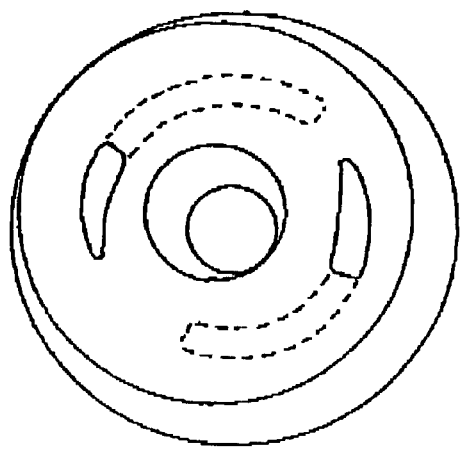

FIGS. 6e and 6f show the "closed" and "open" positions in a cold temperature setting.

Figure 7:
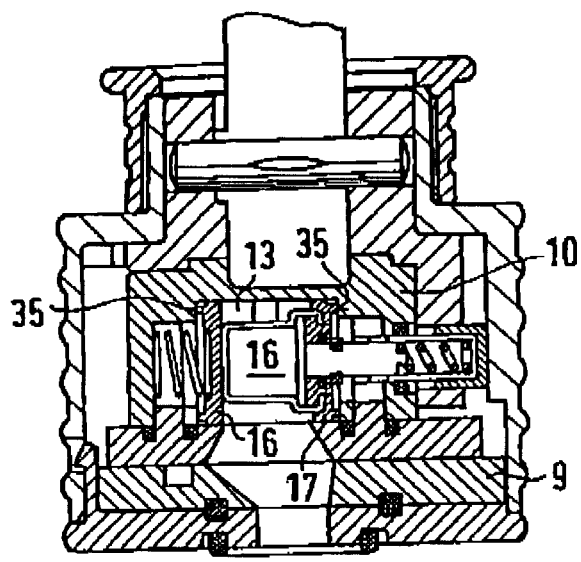
FIG. 7 A section corresponding to FIG. 1 in a further embodiment.

FIG. 7 shows a section corresponding to FIG. 1 in a second embodiment and here essentially only the regulating unit arrangement differs. The movable control disk 9 is constructed as a planar disk, so that the inner space 13 within the dog 10 is formed. At both ends and as a transition to the entrance spaces for the cold and hot water, the inner spacing 13 forms a shoulder 35, said shoulders forming the valve seats for the valve element 17. The valve element has a similar construction to that in the embodiment of FIG. 1. Here again both the cold and hot water flow axially from the outside to the inside into the space 13, where the extensible material element 16 in the regulating unit is provided. From there the mixed water flows through a central outlet from the cartridge.

Figure 8:
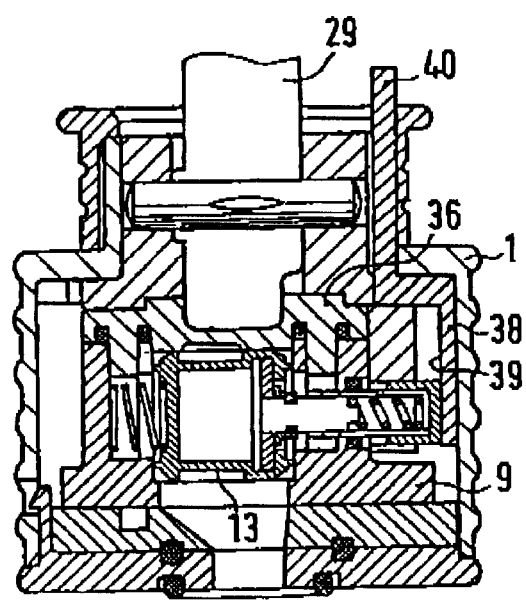
FIG. 8 A further axial section through a further embodiment.

FIG. 8 shows an embodiment in which the receptacle for the regulating unit is located in the movable control disk 9, said receptacle being terminated by a cover 36, into which engages the control lever 29. Once again the valve seats are formed by tori and which once again the water flows axially from the outside to the inside and from the space 13 passes radially out of the valve.

Figure 9:
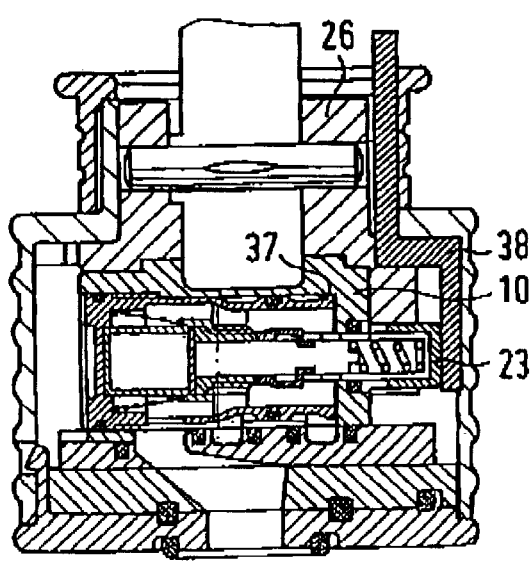
FIG. 9 An axial section through a further embodiment.

FIG. 9 shows a modified embodiment, in which the regulating unit 15 has a different construction. It is located in the dog or mounting support 10. The closure body 37 is here constructed as a one-piece sleeve, whose axial terminal ends form the valve seats with the opposing surfaces provided there.

In the embodiments according to FIGS. 8 and 9, sliders 38 are in each case provided on the inside of the cartridge casing 1 and their radial insides 39 form the eccentric surfaces for the adjusting cap 23 held in the dog 26. The sliders 38 have an axial step 40 projecting from the casing 1 towards its outside. With the aid of said step 40 the eccentric can be circumferentially moved, so that the normal position of the eccentric in the circumferential direction can be modified. This makes it possible to associate the temperature of e.g. 38° C. with a specific control lever position.

What is claimed is:

1. Temperature-controlled mixer valve, comprising:

a fixed distributor disk, a movable control disk, which is movable in at least one degree of freedom with respect to the fixed distributor disk and engages flat on a control surface of the fixed distributor disk, an operating device for moving the movable control disk in the first degree of freedom for controlling the mixed water quantity, a regulating unit for regulating the mixed water temperature, wherein the movable control disk is movable in a second degree of freedom for modifying a setting of desired temperature of the temperature-controlled mixer valve.

2. Mixer valve according to claim 1, wherein the regulating unit has an axis that is parallel to the control surface.

3. Mixer valve according to claim 2, wherein the regulating unit axis is at right angles to a direction of a closing movement of the movable control disk for controlling the mixed water quantity.

4. Mixer valve according to claim 1, wherein the regulating unit is moved together with the control disk.

5. Mixer valve according to claim 1, wherein the movable control disk is movable in the second degree of freedom by the regulating unit in response to the mixed water temperature and is also movable in the second degree of freedom by adjustment of the operating device.

6. Mixer valve according to claim 1, wherein the movement of the control disk in the second degree of freedom does not change relative sizes of alignable openings for cold and hot water through the fixed distributor disk the movable control disk.

7. Mixer valve according to claim 1, wherein the operating device moves the movable control disk in a second movement direction according to the second degree of freedom, for modifying the setting of the desired temperature of the temperature-controlled mixer valve.

8. Mixer valve according to claim 1, wherein the operating device comprises a device for setting an adjustment of the desired temperature.

9. Mixer valve according to claim 1, wherein the regulating unit is positioned in such a way that at least one of a mixed water outlet and an extensible material element of the regulating unit is located, in a flow direction, between a valve seat for hot water and a valve seat for cold water.

10. Mixer valve according to claim 1, wherein the regulating unit is located on the movable control disk.

11. Mixer valve according to claim 1, wherein the regulating unit is located in a dog affixed to the movable control disk.

12. Mixer valve according to claim 1, wherein no seal is provided between the two valves.

13. Mixer valve according to claim 1, wherein the regulating unit comprises a thermostat with an extensible material element and a control bush.

14. Temperature-controlled mixer valve comprising:

a fixed distributor disk, a movable control disk, which is movable in at least one degree of freedom with respect to the fixed distributor disk and engages flat on a control surface of the fixed distributor disk, an operating device for moving the movable control disk and consequently for controlling the mixed water quantity, a regulating unit for regulating the mixed water temperature, wherein the movable control disk is movable in a second degree of freedom, and, wherein for modifying a desired temperature, an eccentric surface is provided, on which engages a component operatively connected to the regulating unit.

15. Mixer valve according to claim 14, wherein the component operatively connected to the regulating unit comprises an adjusting cap that is rotated to adjust the movable control disk.

16. Mixer valve according to claim 14, wherein the eccentric surface is formed on an inner wall of a cartridge casing of the mixer valve.

17. Mixer valve according to claim 16, wherein the eccentric surface is formed by a slider located on the inner wall of the cartridge casing.

18. Mixer valve according to claim 17, wherein the slider is constructed in such a way that it can be circumferentially adjusted.

19. Mixer valve according to claim 15, wherein the adjusting cap is operatively connected to the regulating unit in such a way that during a movement of the control disk in a quantity change direction, there is no adjustment of a temperature setting of the regulating unit.

20. Mixer valve according to claim 15, wherein the regulating unit engages with a tappet in a groove in the adjusting cap extending in the quantity change direction.

21. Mixer valve according to claim 14, further comprising an adjusting cap for relatively adjusting the regulating unit and the eccentric surface.

* * * * *